US010150529B2

(12) United States Patent
Augustinoy et al.

(10) Patent No.: US 10,150,529 B2
(45) Date of Patent: Dec. 11, 2018

(54) VERTICALLY FOLDING BICYCLE WITH LOCKING MECHANISM

(71) Applicants: Agustin Augustinoy, Cordova (AR); Eric Sevillia, New York, NY (US); Lucas Daniel Toledo, Cordova (AR)

(72) Inventors: Agustin Augustinoy, Cordova (AR); Eric Sevillia, New York, NY (US); Lucas Daniel Toledo, Cordova (AR)

(73) Assignee: Bignay, Inc.

( * ) Notice: Subject to any disclaimer, the term of this patent is extended or adjusted under 35 U.S.C. 154(b) by 266 days.

(21) Appl. No.: 14/732,479

(22) Filed: Jun. 5, 2015

(65) Prior Publication Data

US 2015/0353160 A1 Dec. 10, 2015

Related U.S. Application Data

(60) Provisional application No. 62/008,533, filed on Jun. 6, 2014.

(51) Int. Cl.
*B62K 15/00* (2006.01)

(52) U.S. Cl.
CPC ...... *B62K 15/006* (2013.01); *B62K 2015/001* (2013.01)

(58) Field of Classification Search
CPC .......... B62K 15/006; B62K 2015/001
USPC ........................................ 280/278
See application file for complete search history.

(56) References Cited

U.S. PATENT DOCUMENTS

| 1,584,568 | A | * | 5/1926 | Clark | B62K 15/006 280/278 |
| 3,342,281 | A | * | 9/1967 | Elia | B62K 3/10 180/205.7 |
| 3,374,009 | A | * | 3/1968 | Jeunet | B62K 15/006 280/287 |
| 3,419,283 | A | * | 12/1968 | Newland | B62K 15/006 280/278 |
| 3,979,136 | A | * | 9/1976 | Lassiere | B62K 15/006 280/236 |
| 3,993,322 | A | * | 11/1976 | Van Tijen | B62K 15/006 241/245 |
| 4,067,589 | A | * | 1/1978 | Hon | B62K 15/006 280/278 |
| 4,113,271 | A | * | 9/1978 | Furia | B62K 15/006 280/287 |

(Continued)

*Primary Examiner* — Joseph M Rocca
*Assistant Examiner* — Conan D Duda
(74) *Attorney, Agent, or Firm* — Steven Schlackman; Diana Mederos

(57) ABSTRACT

The present invention is a folding bicycle that folds along a vertical axis into a compact, free standing unit. Specifically, the present invention comprises a front frame assembly and a rear frame assembly connected at a hinge point. The method of folding the bicycle is quick and easy, resulting in a folded position wherein the front and rear wheels are near adjacent. An optional bushing assembly at the hinge point laterally separates the front and rear frame assemblies as the bicycle folds. The folded bicycle can be easily rolled while folded to another location. When stationary, the seat post and saddle act as a floor rest to keep the folded bicycle balanced in its upright position. The folding mechanism can be locked or unlocked using a remote wireless device, such as a mobile phone.

10 Claims, 17 Drawing Sheets

(56) References Cited

U.S. PATENT DOCUMENTS

| | | | | |
|---|---|---|---|---|
| 4,284,288 A * | 8/1981 | Fulton | B62K 15/006 | 280/278 |
| 4,422,663 A * | 12/1983 | Hon | B62K 15/006 | 280/278 |
| 4,579,360 A * | 4/1986 | Nishimura | B62K 15/006 | 280/278 |
| 5,149,119 A * | 9/1992 | Hwang | B62K 15/006 | 280/275 |
| 5,269,550 A * | 12/1993 | Hon | B62K 15/006 | 280/278 |
| 5,590,895 A * | 1/1997 | Hiramoto | B62K 15/006 | 280/278 |
| 6,116,629 A * | 9/2000 | Koppensteiner | B62K 25/005 | 280/278 |
| 6,135,478 A * | 10/2000 | Montague | B62K 15/00 | 280/278 |
| 6,293,575 B1 * | 9/2001 | Burrows | B62K 15/006 | 280/278 |
| 6,336,649 B1 * | 1/2002 | Lin | B62H 1/02 | 224/418 |
| 6,394,479 B1 * | 5/2002 | Liu | B62K 15/006 | 16/324 |
| 6,688,625 B1 * | 2/2004 | Schreuder | B62K 15/008 | 280/260 |
| 6,702,312 B1 * | 3/2004 | Miksik | B62J 1/04 | 280/278 |
| 6,739,421 B1 * | 5/2004 | Miya | B62K 15/006 | 180/206.1 |
| 7,229,089 B2 * | 6/2007 | Mihelic | B62K 15/008 | 280/278 |
| 7,232,143 B1 * | 6/2007 | Ferguson | B62K 15/006 | 280/278 |
| 7,490,842 B1 * | 2/2009 | Ulrich | B62K 15/006 | 280/278 |
| 7,510,202 B1 * | 3/2009 | Shiao | B62K 15/006 | 280/278 |
| 8,430,414 B1 * | 4/2013 | Yap | B62K 15/008 | 280/278 |
| 8,528,928 B1 * | 9/2013 | Kim | B62K 15/006 | 280/287 |
| 2002/0053780 A1 * | 5/2002 | Weisz | B62K 15/006 | 280/287 |
| 2003/0127825 A1 * | 7/2003 | Chen | B62K 15/006 | 280/287 |
| 2003/0234509 A1 * | 12/2003 | Chen | B62K 15/006 | 280/278 |
| 2004/0129472 A1 * | 7/2004 | Cheng | B62K 15/006 | 180/181 |
| 2004/0190984 A1 * | 9/2004 | Hon | B62K 15/006 | 403/322.4 |
| 2005/0029033 A1 * | 2/2005 | Rip | B62H 5/20 | 180/220 |
| 2005/0073121 A1 * | 4/2005 | Chen | B62K 15/006 | 280/87.05 |
| 2005/0263981 A1 * | 12/2005 | Kettler | B62K 9/02 | 280/287 |
| 2006/0087095 A1 * | 4/2006 | Huang | B62K 15/006 | 280/278 |
| 2006/0163837 A1 * | 7/2006 | Sutherland | B62K 15/006 | 280/284 |
| 2006/0165476 A1 * | 7/2006 | Lin | B62K 5/025 | 403/94 |
| 2006/0175797 A1 * | 8/2006 | Sanders | B62K 15/006 | 280/287 |
| 2007/0018421 A1 * | 1/2007 | Chen | B62K 15/006 | 280/278 |
| 2007/0051548 A1 * | 3/2007 | Kosco | B62K 5/025 | 180/208 |
| 2008/0067779 A1 * | 3/2008 | Huang | B62K 15/006 | 280/287 |
| 2009/0014981 A1 * | 1/2009 | Perry | B62K 3/02 | 280/281.1 |
| 2009/0058038 A1 * | 3/2009 | Dodman | B62K 3/10 | 280/274 |
| 2010/0135715 A1 * | 6/2010 | Huang | B62K 15/006 | 403/83 |
| 2010/0175939 A1 * | 7/2010 | Cheng | B60R 16/04 | 180/68.5 |
| 2010/0234153 A1 * | 9/2010 | Lu | B62K 15/006 | 474/78 |
| 2010/0253040 A1 * | 10/2010 | Lin | B62K 15/006 | 280/288.4 |
| 2010/0283221 A1 * | 11/2010 | Yeh | B62K 15/006 | 280/287 |
| 2010/0289245 A1 * | 11/2010 | Yang | B62K 15/006 | 280/278 |
| 2011/0024217 A1 * | 2/2011 | Sluijter | B62K 11/10 | 180/208 |
| 2011/0025016 A1 * | 2/2011 | Waaijer | B62H 5/003 | 280/287 |
| 2011/0169246 A1 * | 7/2011 | Lin | B62K 15/006 | 280/278 |
| 2011/0254252 A1 * | 10/2011 | Hsieh | B62K 15/006 | 280/639 |
| 2011/0305502 A1 * | 12/2011 | Lo | B62K 15/006 | 403/84 |
| 2012/0043148 A1 * | 2/2012 | Brady | B60L 3/0069 | 180/206.5 |
| 2012/0169027 A1 * | 7/2012 | Poullet | B62H 1/00 | 280/278 |
| 2012/0169029 A1 * | 7/2012 | Marais | B62K 15/006 | 280/287 |
| 2012/0273287 A1 * | 11/2012 | Song | B62K 15/006 | 180/65.31 |
| 2013/0020777 A1 * | 1/2013 | Chen | B62K 15/006 | 280/87.021 |
| 2013/0062129 A1 * | 3/2013 | Sunami | B62K 3/10 | 180/65.1 |
| 2014/0035254 A1 * | 2/2014 | Jurek | B62K 3/005 | 280/259 |
| 2014/0076649 A1 * | 3/2014 | Kim | B62K 15/008 | 180/220 |
| 2014/0076651 A1 * | 3/2014 | Kim | B62K 11/02 | 180/220 |
| 2014/0225348 A1 * | 8/2014 | Wu | B62K 15/008 | 280/278 |
| 2014/0262578 A1 * | 9/2014 | Calley | B62D 61/065 | 180/210 |
| 2014/0291959 A1 * | 10/2014 | Yap | B62K 15/006 | 280/278 |
| 2014/0356050 A1 * | 12/2014 | Yu | B62K 19/18 | 403/110 |
| 2015/0042065 A1 * | 2/2015 | Wang | B62K 15/008 | 280/287 |
| 2015/0060176 A1 * | 3/2015 | Paick | B62M 6/60 | 180/208 |
| 2015/0066267 A1 * | 3/2015 | Chun | B62M 6/50 | 701/22 |
| 2015/0210340 A1 * | 7/2015 | Wang | B62K 15/006 | 280/278 |
| 2015/0232141 A1 * | 8/2015 | Bettin | B62J 1/007 | 280/259 |
| 2015/0291243 A1 * | 10/2015 | Ounapuu | B62K 15/006 | 280/287 |
| 2015/0321720 A1 * | 11/2015 | Huennekens | B62K 3/02 | 280/278 |
| 2016/0016625 A1 * | 1/2016 | Williams | B62M 6/55 | 280/287 |
| 2016/0016627 A1 * | 1/2016 | Thompson | B62M 6/65 | 180/206.2 |
| 2016/0016628 A1 * | 1/2016 | Thompson | B62K 15/008 | 180/220 |
| 2016/0016635 A1 * | 1/2016 | Thompson | B62K 15/006 | 301/124.2 |
| 2016/0031525 A1 * | 2/2016 | Craven | B62J 99/00 | 180/206.2 |
| 2016/0297495 A1 * | 10/2016 | He | B62K 15/008 | |

(56) References Cited

U.S. PATENT DOCUMENTS

| | | | |
|---|---|---|---|
| 2017/0021885 A1* | 1/2017 | Montague | B62H 1/04 |
| 2017/0021892 A1* | 1/2017 | Montague | B62K 3/02 |
| 2017/0021894 A1* | 1/2017 | Bettin | B62J 1/007 |

* cited by examiner

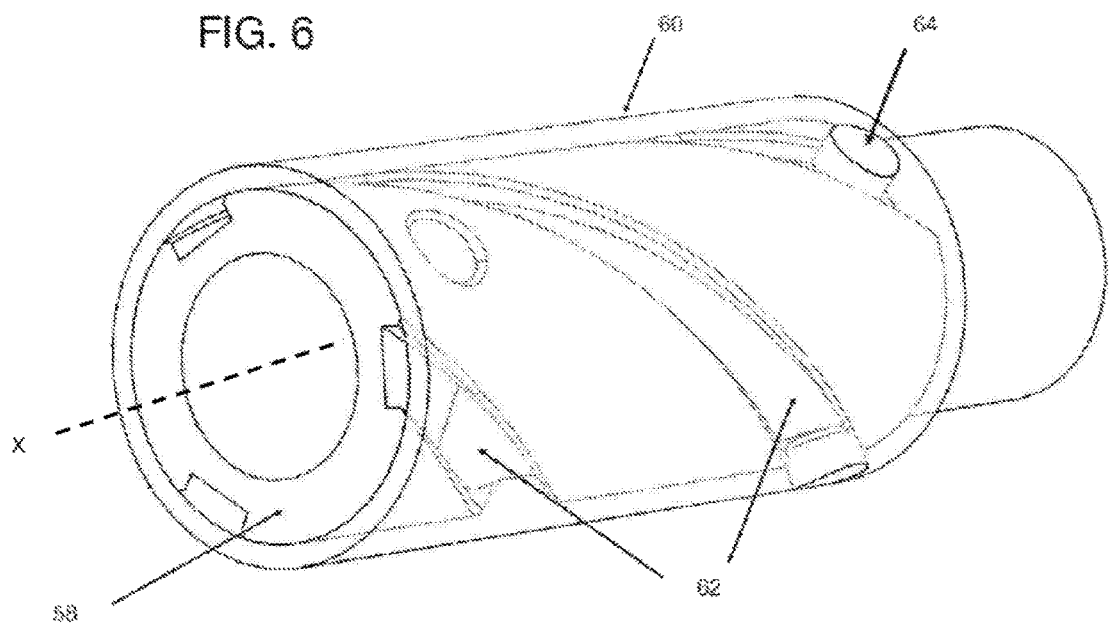

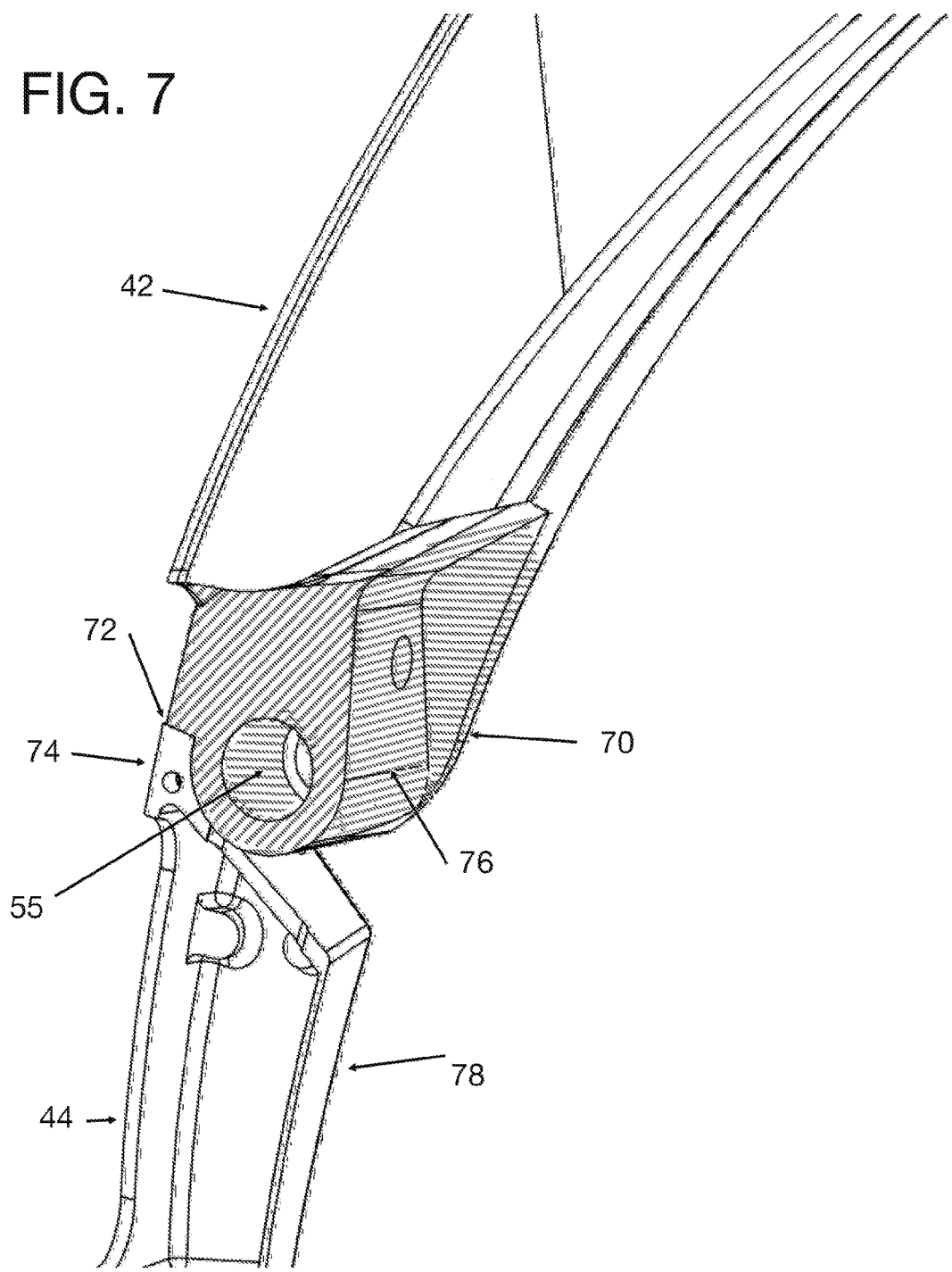

VERTICALLY FOLDING BICYCLE WITH LOCKING MECHANISM

FIELD OF THE INVENTION

The present invention is a folding bicycle that folds along a longitudinal axis of a helicoidal bushing assembly and into a compact, free standing unit. Specifically, the present invention comprises a front frame assembly and a rear frame assembly connected at a hinge point. The method of folding the bicycle is quick and easy, resulting in a folded position wherein the front and rear wheels are near adjacent. An optional bushing assembly at the hinge point laterally separates the front and rear frame assemblies as the bicycle folds. The folded bicycle can be easily rolled while folded to another location. When stationary, the seat post and saddle act as a floor rest to keep the folded bicycle balanced in its upright position. The folding mechanism can be locked or unlocked using a remote wireless device, such as a mobile phone.

BACKGROUND OF THE INVENTION

The bicycle market, particularly in the United States and Europe, has been growing steadily. As the population adopts a healthier and fitness conscious lifestyle, many have turned to bicycling as part of their fitness regimen. Additionally, rising fuel costs, increased congestion on roads, lack of parking availability as well as the increased focus on eco-friendly means of transportation in order to curb pollution, have made bicycles the emerging alternatives for shorter distance transportation. Moreover, regulatory initiatives to promote cycling in order to reduce harmful carbon emissions and noise pollution have purred bicycle industry growth.

In major cities where living and working space is at a premium, the downside of a traditional bicycle is its large footprint, so there has been an increased demand for folding bicycles that have a smaller footprint. The compact nature of a folding bicycle, allows it to be stored out of the way, in unused corners of an office or in an apartment closet, when not in use. Additionally, folding bicycles are ideal for commuting, where a person can ride to a train or subway, fold the bicycle to bring on the train, and then finishing the commute by unfolding the bike and riding to the office.

However, because folding bicycles need to maintain a strong frame due to the stresses put on the frame while riding, the majority of folding bicycles maintain the traditional diamond frame configuration, which is made of two triangles; a main triangle and a paired rear triangle.

The diamond frame construction makes it extremely difficult to fold a bicycle on the longitudinal axis as a vertical fold would require more than one folding point. As well, bicycles are in line from the front wheel assembly to the back wheel, so a vertical fold will result in the front and rear wheels coming into contact, limiting the folding range. Folding frames instead use a horizontal hinge point (with single or double hinges) allowing the bicycle to fold approximately in half along a horizontal axis.

Other types of folding bicycles, such as the triangle hinge style, allow the rear triangle and wheel to be folded down and flipped forward, under the main frame tube. Some of these types may also have a secondary folding hinge at the front fork assembly.

An additional problem with many folding bicycles is that although compact when folded, moving them while folded requires that they be carried. To make carrying the bicycles easier, most tend to use smaller wheels, which makes the folded bike easier to carry but also hampers the riding experience.

DESCRIPTION OF THE PRIOR ART

Consider several types of folding bicycles in the prior art.

The Folding Bicycle Assembly in publication number U.S. Pat. No. 8,430,414 B1 uses a trifold system in which a plurality of hinge couplings allow the bike to fold in thirds. This system requires small wheels, and a modified diamond frame. The small wheels and small frame require a higher seat and steering column than traditional bicycles. As such, a plurality of quick-release clamps are required to lower the seat and handlebars when folded. The complicated folding mechanism not only takes time, but when opened, the seat and handlebars must be reset to the riders optimal position, which may need adjustment each time the bicycle is opened.

The Folding Bicycle in patent publication number U.S. Pat. No. 7,229,089 B2 has small wheels on a small diamond frame. The invention requires the front wheel assembly to fold at the front fork assembly, and a dual vertical hinge on the rear wheel assembly, and a complicated folding strut assembly that separates the bicycle chain into two separate chain mechanisms, wherein the rear strut can picot around a second chain stay. An optional folding handlebar assembly can be added to increase the compactness.

The Universal Folding Bicycle in U.S. Pat. No. 6,702,312 B1 has small wheels with a modified diamond frame configuration. The bicycle in this invention has freely adjustable folding handlebars, a vertically folding rotary joint on the front fork assembly with a telescopic springing mechanism, a telescopic seat stem, and a second rotary joint on the rear fork assembly with a telescopic springing mechanism. To fold the bicycle, the handlebars must be rotated 90 degrees to the vertical position, then the front back wheel are released and folded into the center frame. The seat is then swung into the center sliding out of a telescopic stem.

Finally, the Folding Bicycle in U.S. Pat. No. 7,490,842 B1 also uses small wheels on a modified diamond frame. In this invention, the rear fork assembly extends to a pivot axis on the main horizontal frame tube between the seat post and handlebars. The vertical seat tube has a breakaway that splits the tube into an upper seat tube and a lower seat tube. The breakaway allows the rear wheel assembly, which includes the lower seat tube, to pivot forward around the pivot hinge toward the front wheel assembly.

All of these folding mechanisms involve multiple steps that take considerable time to accomplish. There is a need for a folding bicycle that can be done easily and quickly.

SUMMARY OF THE INVENTION

The current invention is a vertically folding bicycle with a unique frame geometry that allows the bicycle to fold vertically with a single hinge.

The mechanical core of a bicycle is the bicycle frame, which provides points of attachment for the various components, such as the seat post, handlebars or wheel forks. The length of the frame tubes, and the angles at which they are attached, define a frame geometry.

Frame geometry determines frame strength and performance characteristics. Frame geometries are dictated by the type or riding, i.e. racing bicycles have different frame geometries than mountain bicycles. For example, head tube angle is the angle the head tube forms with the ground. The steeper the angle, the faster a bike will turn and the better it will climb. A shallower angle provides for slower steering but increased stability at higher speeds.

The invention utilizes a Y-frame geometry so that only a single hinge point is necessary, while also maintaining strength and performance characteristics of a traditional bicycle.

The current invention has a front frame assembly having a forward end adapted for mechanical engagement with a front fork assembly, handlebar assembly and standard size front wheel assembly. A rear frame assembly having a rearward end adapted for mechanical engagement. The front frame assembly having a rearward end and the rear frame assembly having a forward end, each of the rearward and forward end being constructed and arranged for mechanical engagement with a hinge point. The frame has no enclosed triangle as is seen in the diamond and modified diamond configurations.

The front wheel assembly and rear wheel assembly are in axial alignment when in an open position for riding.

The hinge point contains a helicoidal bushing assembly that allows the bicycle to fold along a longitudinal axis, wherein the front and back wheel assemblies rotate in opposite directions between an open position and a folded position, within a folding arc around the bushing assembly.

The front frame assembly and the rear frame assembly, rotating between the open position and the folded position, will separate laterally in an amount sufficient to permit the front wheel assembly and said rear wheel assembly to be essentially adjacent to each other.

The hinge point can be locked at both the open position and closed position for added strength and support.

A release lever for the locking mechanism can be locked as an added safety feature.

The release lever can be unlocked using a wireless remote device.

The seat post and saddle can also be used to balance the bicycle upright when in the folded position.

The folding process is very simple, and can be folded in approximately one second, requiring minimal effort. In its folded position, the bicycle can be moved effortlessly by merely rolling the bicycle.

The frame and folding mechanism are versatile and can be implemented as a traditional pedal bicycle, a pedal assist electric motor or other powered types of bicycles.

Accordingly, it is a primary objective of the instant invention to have a standard sized bicycle frame that can be folded along a longitudinal axis into a compact unit.

It is a further objective of the instant invention to have a method of folding a bicycle that can fold quickly and easily.

It is a still further objective of the invention to provided additional frame support, safety and theft deterrence through the use of a locking mechanism, which can also be activated by a remote wireless device, such as a smartphone.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 6 shows the helicoidal bushing assembly.

FIG. 7 shows the hinge point as viewed from the right side with the bicycle in the open position.

DETAILED DESCRIPTION OF THE INVENTION

For clarity, the invention is shown with standard bicycle parts that are not unique to this invention. For the purposes of this description and associated claims, we adopt the following definitions.

Figure 1:
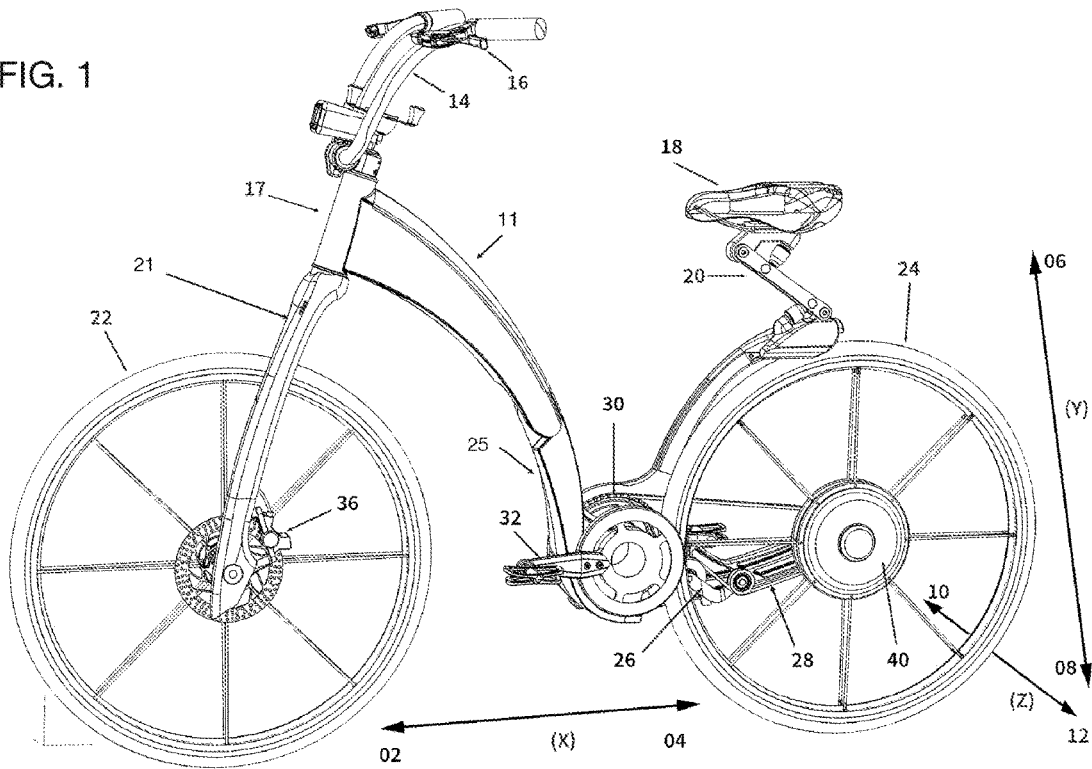
FIG. 1 shows the bicycle frame open, in its riding configuration, with the front wheel assembly and rear wheel assembly axially aligned.

FIG. 1 shows the bicycle frame in the open position.

The embodiment shown is a left side view, the horizontal X axis having a front 02 and a rear 04; the vertical Y axis having a top 06 and bottom 08, and the lateral Z axis having a left side 10 and a right side 12.

The invention shows the following components common to most bicycles: a front tube 11, handlebar 14, rear brake lever 16, head tube 17, saddle 18, front fork assembly 21, front wheel assembly 22, rear tube 25, rear fork assembly 28, rear wheel assembly 24, crank set 30, crank arm and pedals 32, a front tube and a rear tube.

The embodiment shown in FIG. 1 describes several components that are preferred but not required. The present description has a front disc brake 36 which is activated by the front brake lever 16 and an adjustable seat post 20, The rear wheel 24 includes a power assists motor 40, although a power assist motor is not required for the invention. The invention contemplates a standard rear wheel, drum brakes, a rear disk brake, rear derailleur, cog set or any other standard bicycle components.

Figure 1B:
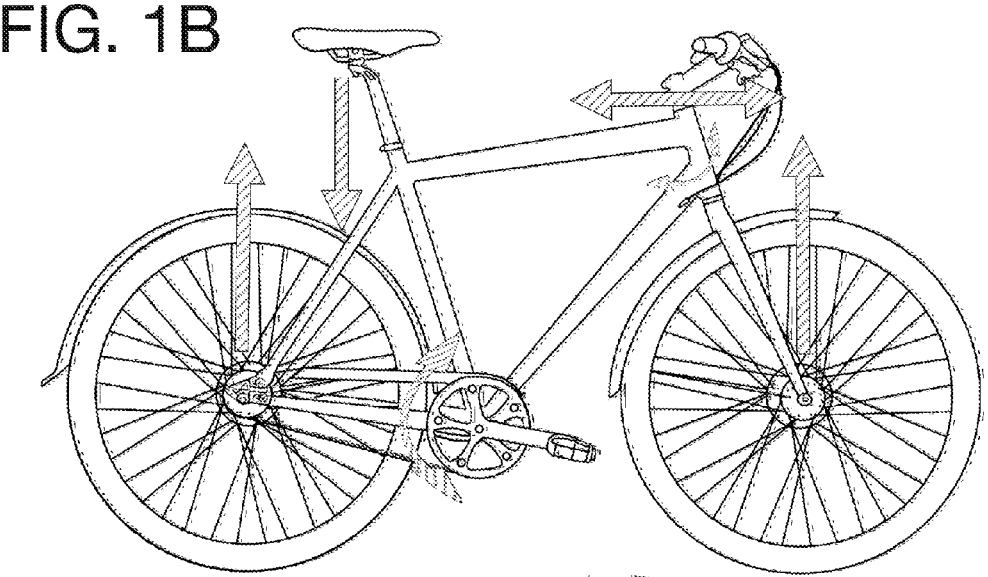
FIG. 1B shows the most common frame design for an upright bicycle.

In contrast, FIG. 1B shows the most common frame design for an upright bicycle, the diamond frame, which is made of two triangles; a main triangle and a paired rear triangle. The frame needs to support itself and other components of the bicycle. These are considered static loads. In addition, the frame must bear the cyclist's weight, the forces of pedaling, braking, and the effects of the road's surface on the various stress points. These are dynamic loads that move throughout the frame's stress points and vary in intensity.

The shaded arrows show the forces exerted on the frame. The diamond frame design is excellent for distributing forces as they shift during a ride.

Figure 1C:
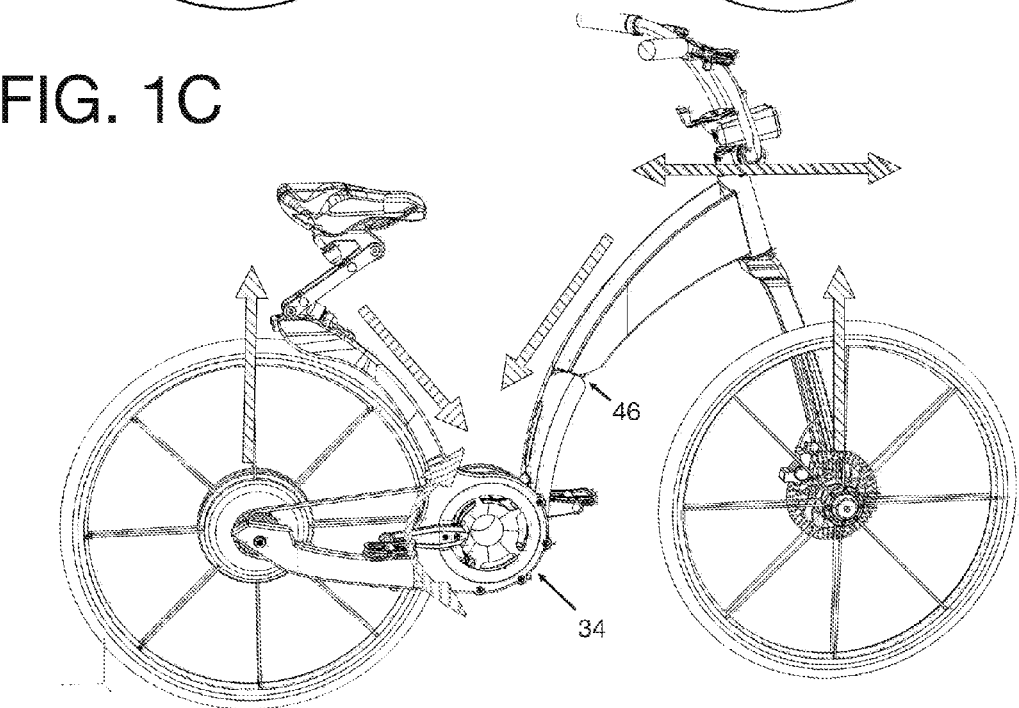
FIG. 1C shows the current invention's unique frame geometry.

FIG. 1C shows the current invention with a frame geometry that uses a single tube frame, not a diamond frame. This configuration enables the bicycle to fold along its longitudinal axis via a single central hinge point 46. The frame geometry has different stress points than a diamond frame, as shown by the shaded arrows. Specifically, additional stress is placed on the crank set area and the hinge point 46.

A circular crank set enclosure 34 distributes the stress more evenly, providing additional strength.

To enhance frame strength and maintain light weight, the bicycle frame is hollow, and constructed of an aluminum alloy. The present invention uses aluminum alloy 6063-T6, made by Alcoa, Inc., however, the invention contemplates other high tensile materials including, but not limited to aluminum 6061, steel, steel alloys, carbon fiber, or those materials not yet invented.

Aluminum 6063-T6 has a number of properties that make it desirable for a bicycle frame, such as low density, ease of welding, favorable strength to weight ratio, heat- and high corrosion properties and low cost. 6063-T6 has as a density of 2.68 g/cm^3 (0.0975 lb/cubic inch), an ultimate tensile strength of at least 28,000 psi (196 MPa) and yield strength of at least 23,000 psi (165 MPa). In thicknesses of 0.124-inch (3.1 mm) or less, it has elongation of 8% or more; in thicker sections, it has elongation of 10%.

The frame has two sections: the front frame assembly 42, and the rear frame assembly 44.

Figure 2A:
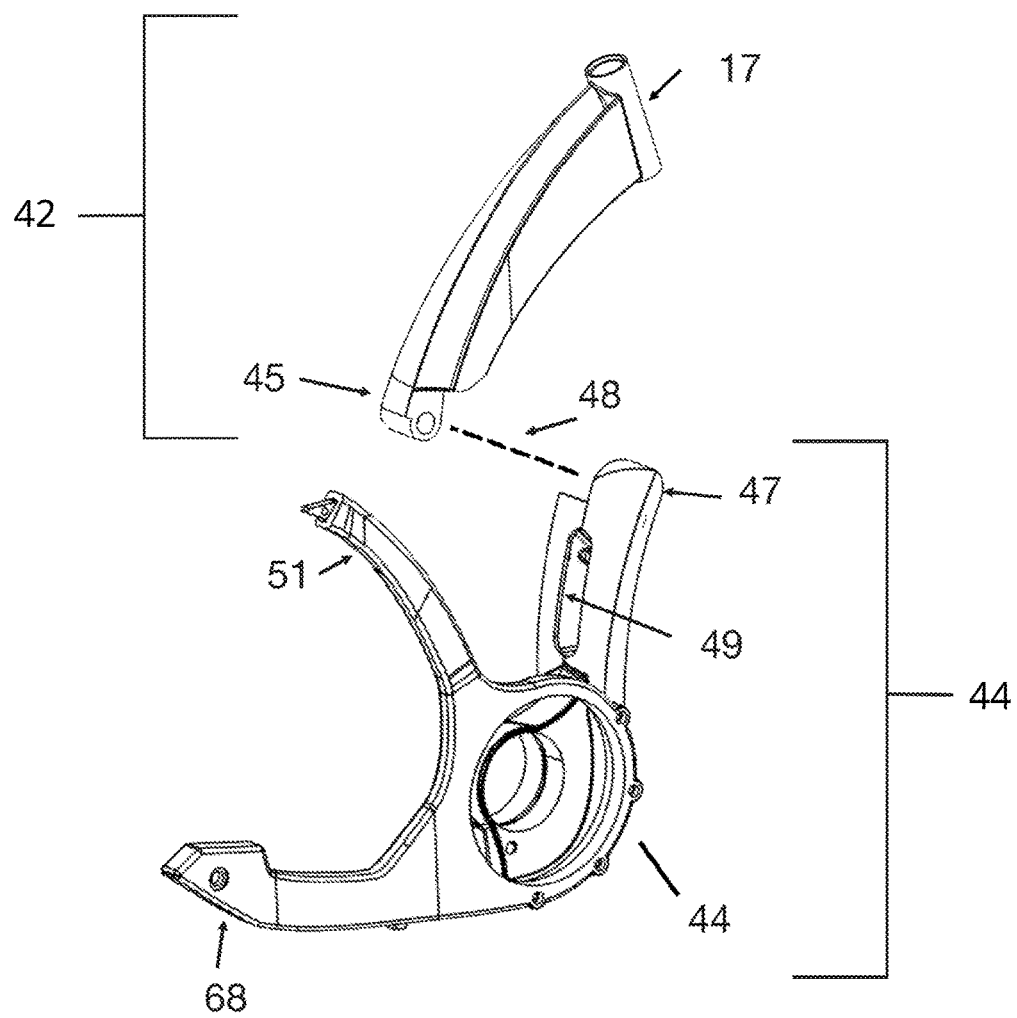
FIG. 2A, shows a forward facing view of the front frame assembly and the rear frame assembly separated at the hinge point.

FIG. 2A, shows a forward facing view of the front frame assembly 42 and the rear frame assembly 44 separated at the hinge point 46.

The front frame assembly 42 has a forward end with a head tube 17 adapted for mechanical engagement with a front fork assembly, the front fork assembly adapted for mechanical engagement with the front wheel assembly 22.

The rear frame assembly 44 has a rearward end adapted for mechanical engagement with a rear fork assembly 28, the rear fork assembly adapted for mechanical engagement with a rear wheel assembly 24.

The rear frame assembly 44 also has a rearward end adapted for mechanical engagement with seat extension post 51, the seat extension post having a mechanical engagement with a seat post 20.

The rear frame assembly 44 may also contain a handle 49, which can be used by the rider to hold the bicycle frame during the folding process.

The front frame assembly 42 has a rearward end, a curved rotation member 45 and the rear frame assembly 44 has a forward end, a square rotation member 47.

The curved rotation member 45 and the square rotation member 47 being constructed and arranged for mechanical engagement with a hinge point 46.

Figure 2B:
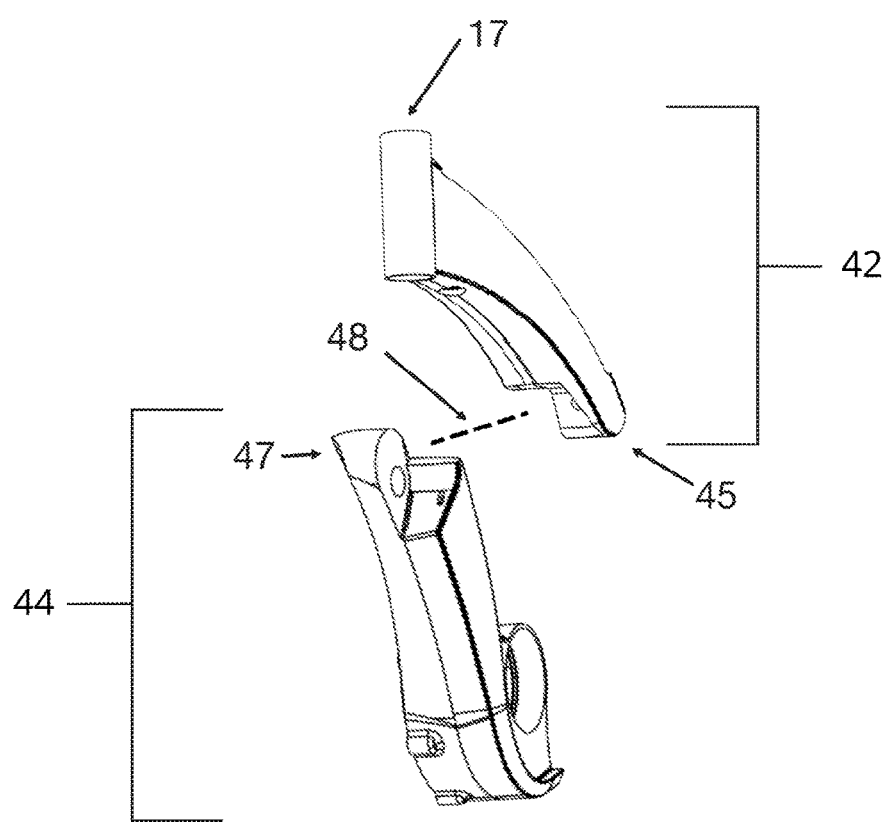
FIG. 2B shows a rear facing view of the front frame assembly and the rear frame assembly separated at the hinge point.

The dotted lines 48 in FIG. 2A and FIG. 2B indicate the connection point of the curved rotation member 45 and the square rotation member 47.

FIG. 2B shows the front frame assembly 42 and rear frame assembly 44, as viewed from the front of the bicycle.

Figure 2C:
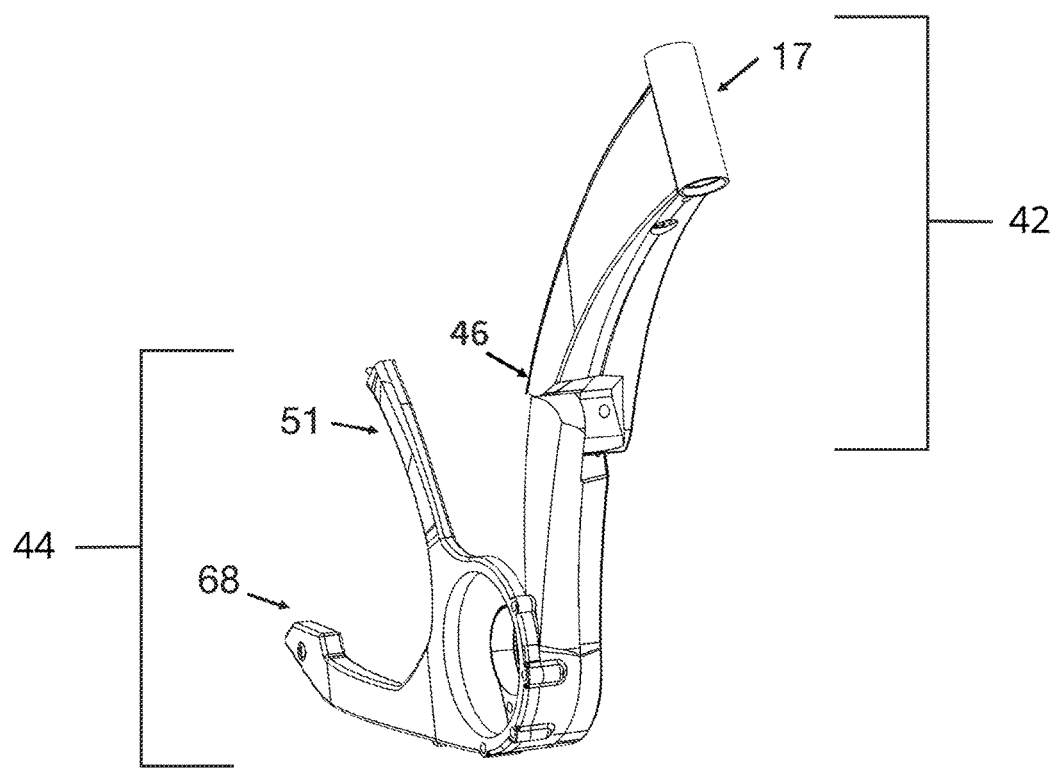
FIG. 2C shows a forward left side view of the front frame assembly and the rear frame assembly connected at the hinge point.

FIG. 2C shows a forward left side view of the front frame assembly 42 and the rear frame assembly 44 connected at the hinge point 46.

Figure 2D:
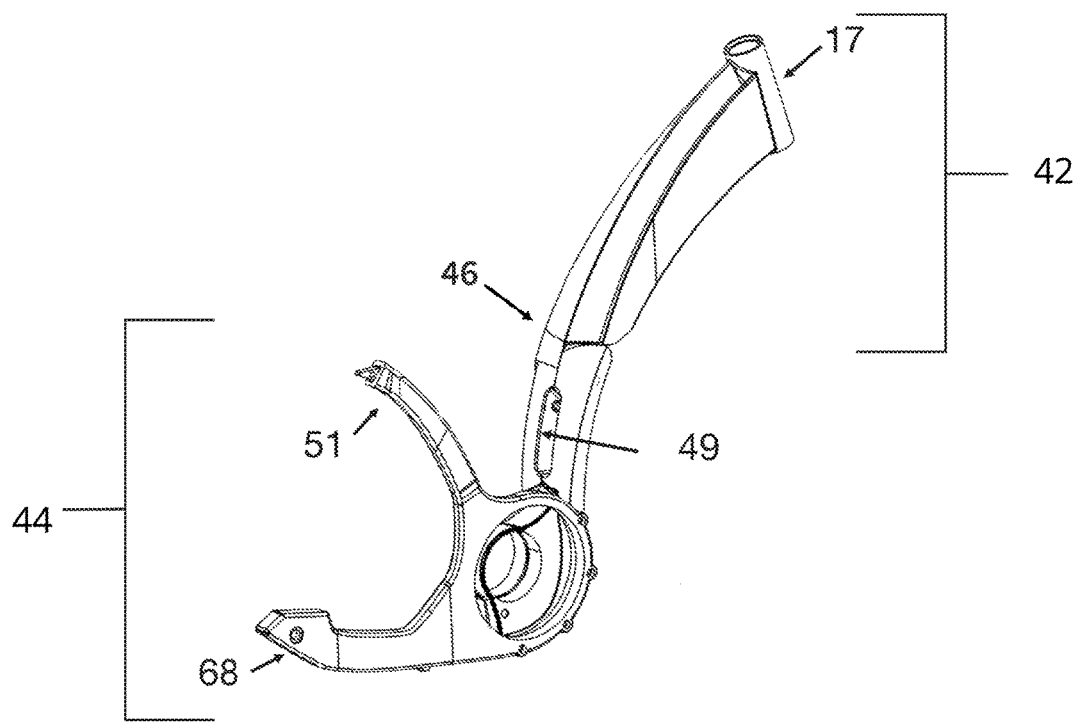
FIG. 2D show a forward right side view of the front frame assembly and the rear frame assembly connected at the hinge point.

FIG. 2D show a forward right side view of the front frame assembly 42 and the rear frame assembly 44 connected at the hinge point 46.

Figure 3:
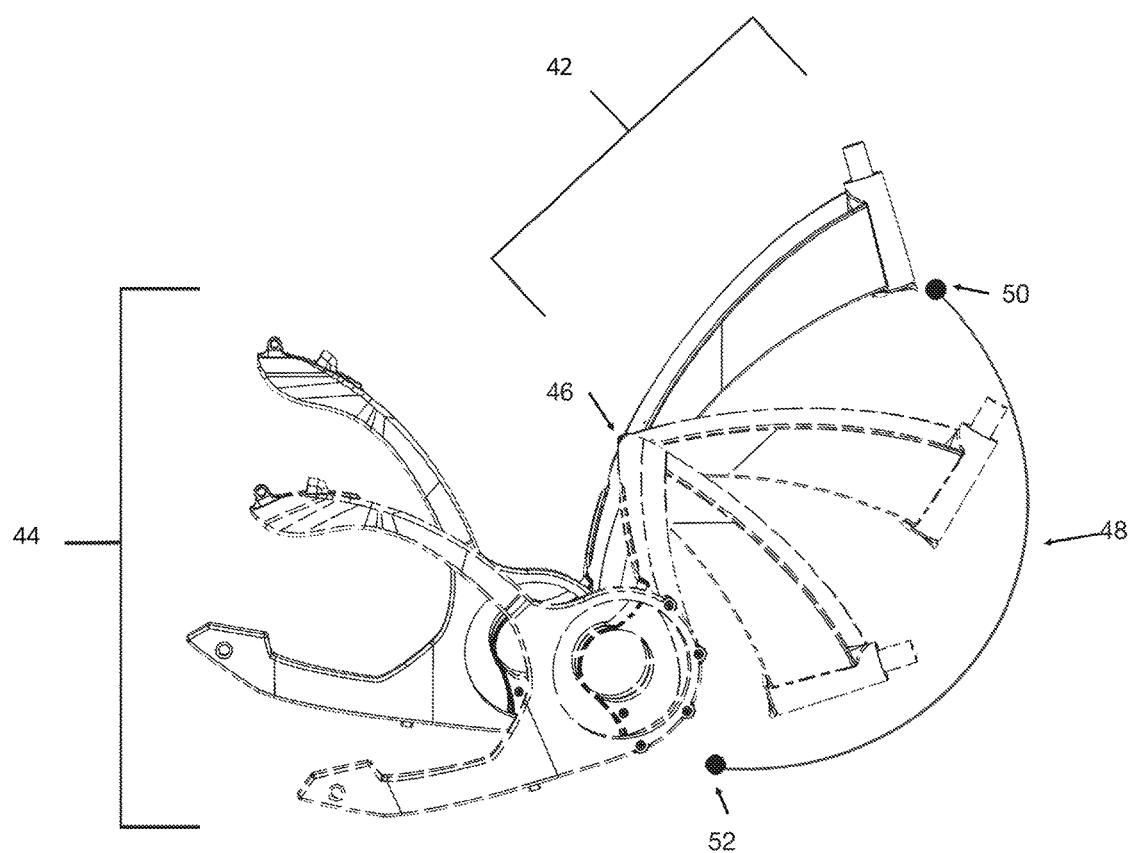
FIG. 3 shows the bicycle frame folding at the hinge point between the open position to the closed position along a folding arc.

FIG. 3 shows the front frame assembly 42 and the rear frame assembly 44 folding at the hinge point 46 along the longitudinal axis. The front frame assembly 42, and the rear frame assembly 44 swing along the folding arc 48, from the open position 50 to the folded position 52.

The front wheel assembly 22 and rear wheel assembly 24 are in axial alignment when in an open position for riding;

The front frame assembly 42 and the rear frame assembly 44 are constructed and arranged for rotation in opposite directions, between the open position 50 and the folded position 52, within a folding arc 48. wherein, upon rotation, the front frame assembly 42 and rear frame assembly 44 separates laterally in an amount sufficient to permit the front wheel assembly 22 and the rear wheel assembly 24 to be essentially adjacent to each other.

Figure 4:
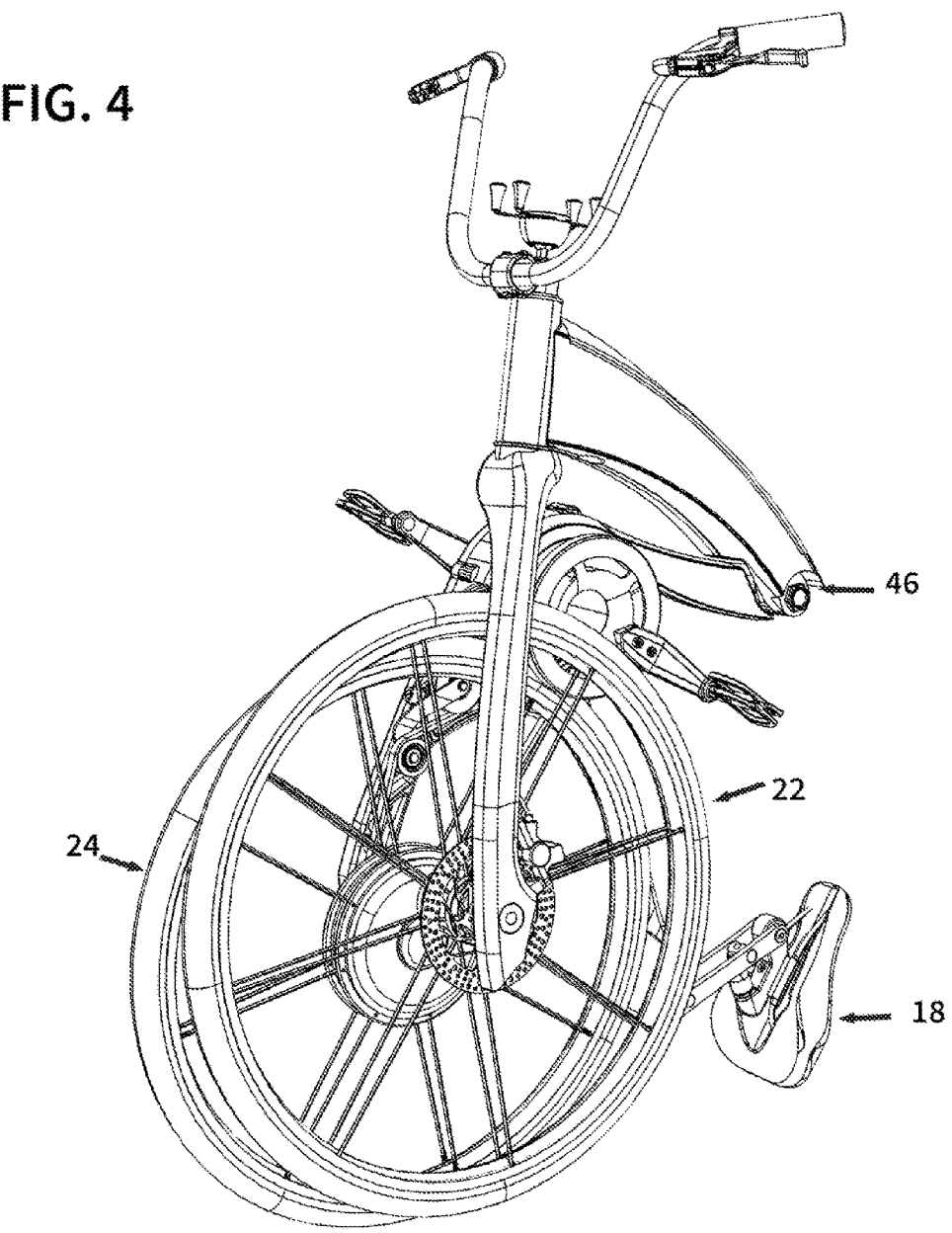
FIG. 4 shows the bicycle frame in the folded position.

FIG. 4 shows the bicycle frame in its folded position. The front wheel assembly 22 and rear wheel 24 are essentially adjacent.

In another embodiment, the saddle 18 balances the bicycle in the upright position, when folded.

Figure 5A:
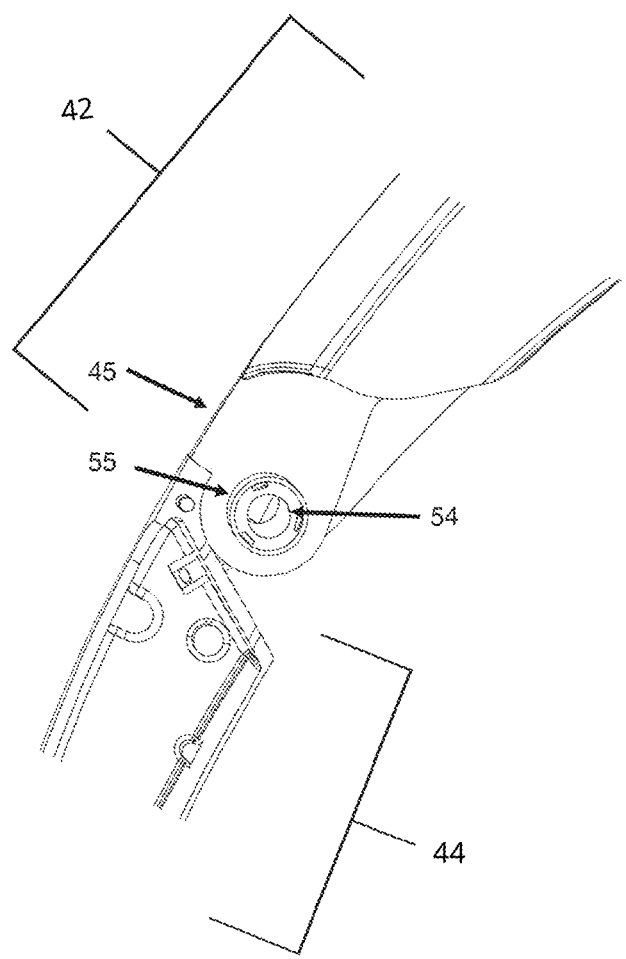
FIG. 5A shows a right side cross-section of the hinge point at the open position.

FIG. 5A shows a right side view, cross-section of the hinge point 46 at the open position.

In one embodiment, the front frame assembly 42 and the rear frame assembly 44 fold around a helicoidal bushing assembly 54 at the hinge point 46; wherein the hinge point 46 contains bushing holes.

The front frame assembly contains a bushing hole 55 inside the curved rotation member 47.

Figure 5B:
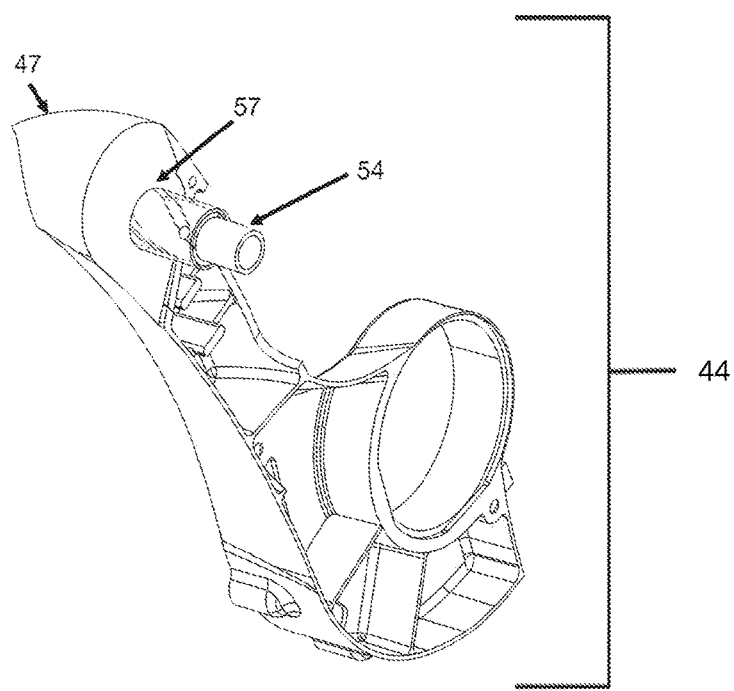
FIG. 5B shows a left side cross-section of the hinge point at the open position.

FIG. 5B shows a left side cross-section of the hinge point 46 at the open position. In this view, the rear frame assembly 44 contains a bushing hole 57 in the square rotation member 47.

FIG. 6 shows the helicoidal bushing assembly 54, containing a helicoidal axle 58 having two or more external helical threads 62, sometimes called female threads, and a helicoidal bushing 60 surrounding a part of the helicoidal axle 58; the helicoidal bushing 60 having interior extrusions 64 that fit within the external helical threads 62. The longitudinal axis, X, is represented by the dashed line.

The helicoidal bushing 60 is adapted for rotation around the helicoidal axle 58; the helicoidal bushing assembly 54 elongating or contracting during rotation, which laterally separates the front frame assembly 42 and the rear frame assembly 44.

The embodiment shown uses a helicoidal bushing 60 that allows free linear movement around the helicoidal axle 58 but other methods are contemplated, including but not limited to free rotation around a fixed axis.

The elongation distance is determined by both the size of the helicoidal bushing assembly 54 and the spacing between the external threads 62 on the helicoidal axle 58. The distance required will depend on the width necessary to avoid contact with bicycle component during the folding process. For example, the current embodiment uses street tires 26"×1.0 and a 250 w 46 v rear wheel brushless electric motor, requiring a lateral separation of at least 40 millimeters in order to fold fully.

The helicoidal bushing assembly 54 in the current embodiment is 5 mm wide, 2 mm deep, with 96 pitch grooves, although other sizes are contemplated.

The helicoidal bushing assembly 54 should be manufactured of a material with the strength comparable to at least SAE 4140 steel.

While there is no limitation on the size of the helicoidal bushing assembly 54, the greater the lateral movement, the more force required to fold and unfold the bicycle. Also, a longer helicoidal bushing assembly 54 could interfere with pedaling. As well, wider separation of the wheels in the folding position decreases stability of the folded bicycle in its standing position. It is therefore recommended that lateral movement requirements be minimized to the extent possible.

In the current embodiment wherein the front fork assembly 21 and the rear fork assembly 28 are single forks, which minimizes the lateral distance required when folding the frame.

To ensure that the frames rotation is confined to the angle of the folding arc 48, (within the folding arc open point 50 and folding arc folded point 52), the frames have structural stopping points.

FIG. 7 shows the hinge point as viewed from the right side with the bicycle in the open position. The front frame assembly 42 is attached to a cross-section of the rear frame assembly 44.

The curved rotation member 45 has an open stop notch 72, which is a cutaway area that corresponds to a stop extension 74 on the upper end of the rear frame assembly 44.

The folding arc open position 50 corresponds to the position where the open stop notch 72 comes into contact with the open stop extension 74, preventing any further open rotation.

The curved rotation member 45 also has a folding stop point 76 on the opposite side of the front frame assembly 42 from stop notch 72. The folding stop point 76 is an area that corresponds to a folded stop area 78 on the upper end of the rear frame assembly 44. When folding the frames, they are rotated along the folding arc 48 from the folding arc open point 50 to the folding arc folded point 52. The folding arc folded point 52 corresponds to the position where the folded stop point 76 comes into contact with the folded stop area 78, preventing any further folded rotation.

Other means of preventing rotation beyond the folding arc's open and folded points are contemplated.

In another embodiment, the hinge point can be locked in the open position 50 or the folded position 52 by means of a locking pin.

In one embodiment, to fold the bicycle, a brake is applied to the rear wheel assembly 24 and the hinge point is unlocked. The rider subsequently rolls the front frame assembly 42 forward until the front wheel assembly 22 and the rear wheel assembly 24 are near adjacent, and engaging a locking pin.

The rear brake is engaged using the rear brake lever 16.

In the folded position, the front wheel assembly 22 and the rear wheel assembly 24 can rotate freely, allowing the bicycle to be wheeled to a different location while remaining in the folded position. The optional handle 49 on the rear frame assembly 44 can be used to hold the bicycle upright when rolling.

Opening the bike uses the reverse process. Holding the brake lever allows the rear wheel assembly 24 to remain stationary while the front wheel assembly 22 moves forward until the bicycle is in the open position.

Holding the brake while folding is not required.

The bicycle frame folds from an open position 50 to a folded position 52 by unlocking the hinge point 46 located between a front frame assembly 42 and a rear frame assembly 44, and applying upward force on the rear frame assembly 44, wherein the front wheel assembly 22 and the rear wheel assembly 24 roll into a near adjacent position.

To open the bicycle frame, unlock the hinge point 46, wherein gravity exerts force onto the center mass, rolling the rear wheel assembly 24 backward while the front wheel assembly 22 rolls forward, until the frame is in the open position 50.

In both the open position 50 and the closed folded position 52, it is recommended that the hinge point 46 be locked to add additional stability.

The present invention contemplates many ways to lock the hinge point.

One embodiment uses a combination electronic/mechanical release mechanism, housed inside the rear frame assembly 44.

Figure 8:
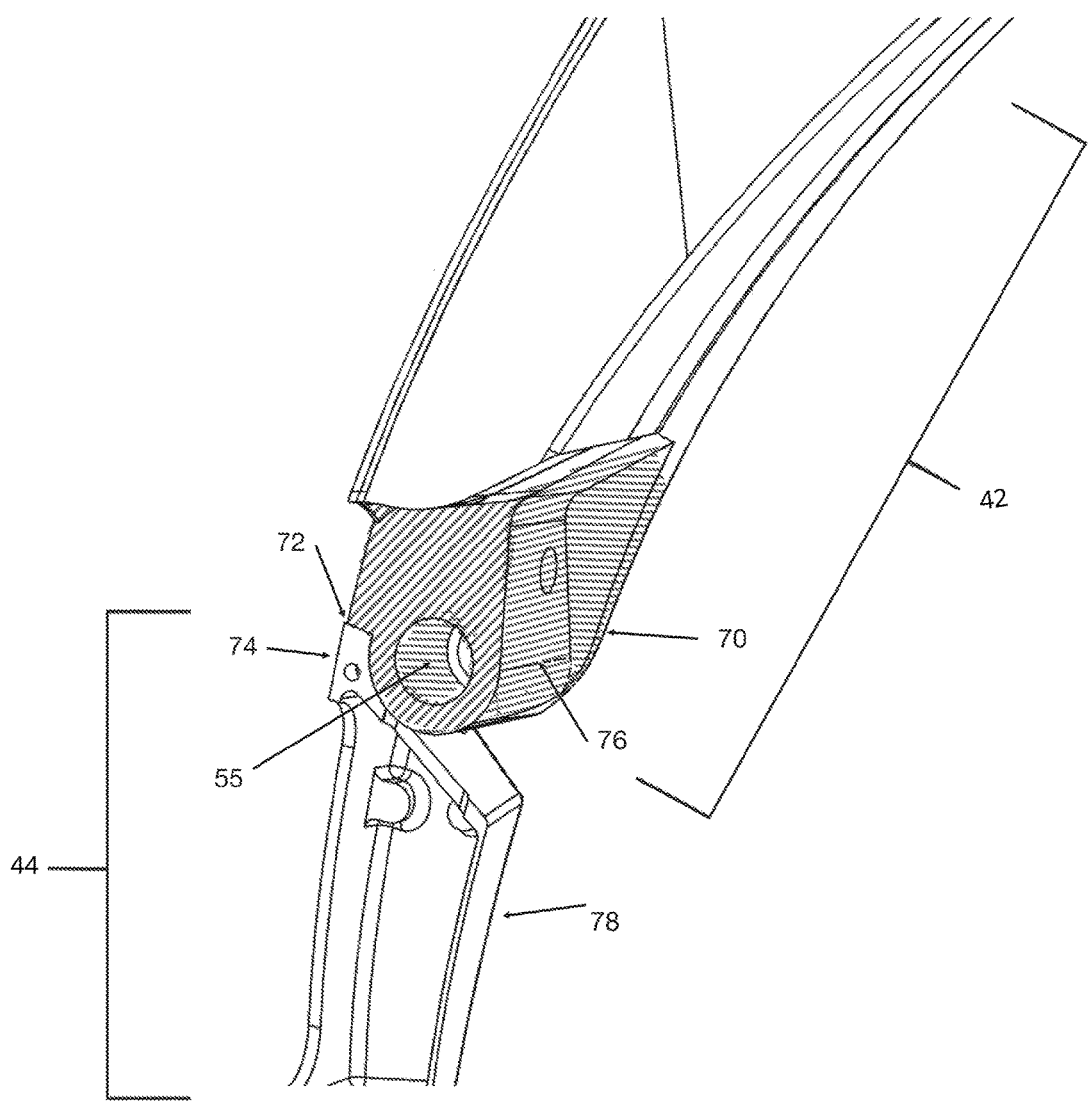
FIG. 8 shows the front frame assembly and rear frame assembly in the open position, with the release lever located on the rear frame assembly.

FIG. 8 shows the front frame assembly 42 and rear frame assembly 44 in the open position, with the release lever 80 located on the rear frame assembly.

Figure 9:
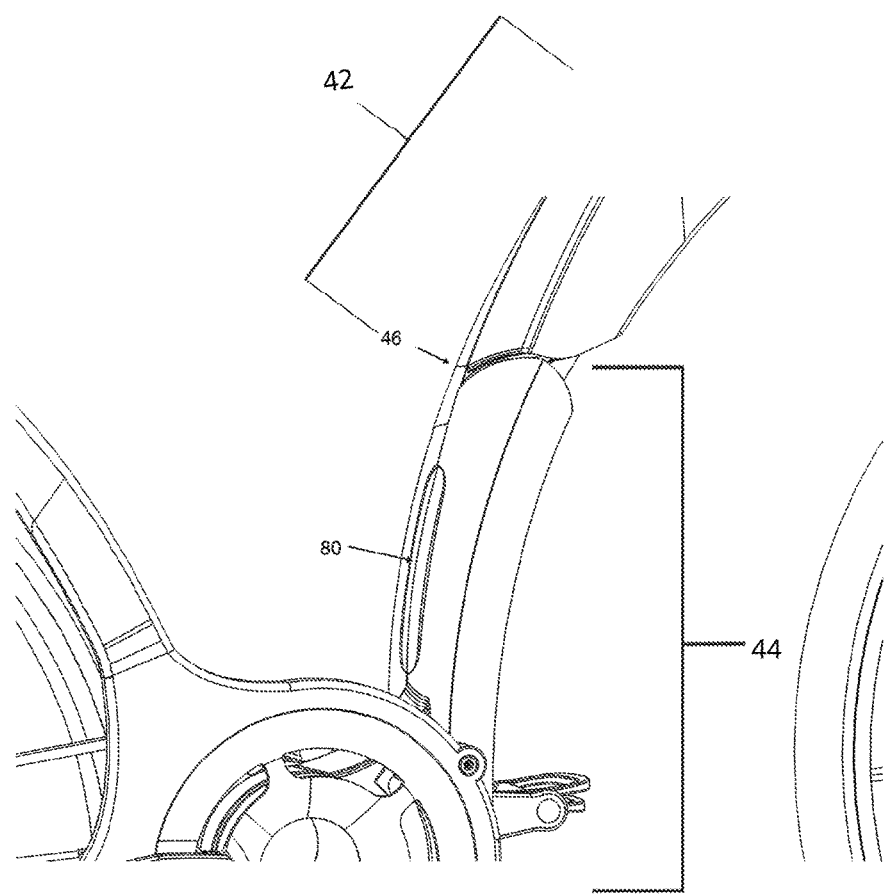
FIG. 9 is a left side view, cutaway of the rear frame assembly, showing the locking mechanism.

FIG. 9 is a left side view, cutaway, of the rear frame assembly 44 showing the components for the locking mechanism.

In this view, the bicycle frame is in its open position 50. The front frame assembly 42 and rear frame assembly 44 are locked at the hinge point 46 via a locking pin 88, that fits into a hole in the curved rotation member 45 of the front frame assembly 44.

To unlock the hinge point 46, the locking pin 88 must be removed from the hole in the curved rotation member 45, which will enable the front frame assembly 42 and rear frame assembly 44 to rotate around the helicoidal bushing assembly 54, from the folding arc open position 50 to the folding arc folded position 52.

In one embodiment, the upper end of the release lever 80 connects to a handle axle 94.

Lifting the lower handle allows the release lever 80 to rotate around the handle axle 94 in an arc. Attached to the inside face of the release lever 80, there is a glide extension 92, which is a flat rounded rectangle extrusion with an open glide channel 93 along its center.

Action arm 90 has a Y-shape configuration, wherein the right side prong of the action arm 90 connects to the handle axis 94, around which the action arm 90 can pivot. The lower end of the action arm 90 has a glide, which is a protruding cylinder that fits into the glide extension channel 93. Rotating the action arm 90 allows the lower end to move in an arc inside the confines of the glide extension channel 93.

Spring 91 stabilizes the release lever 80.

The pulling arm 96 is a T-shaped part that sits between the action arm 90 and locking pin 88. The base of the pulling arm 96 is connected to the left prong of the action arm 90. The left upper end of the pulling arm 96 is connected to a secondary axle 98 around which the pulling arm 96 can pivot. The right upper end of the pulling arm 96 is connected to the locking pin 88.

In the embodiment shown, to unlock the hinge point 46, merely pull the release lever 80, which rotates vertically around the handle axis 94. The glide extension 92 moves toward the rear of the bicycle until the end of the glide channel 93 makes contact with the lower end of the action arm 90, forcing the action arm 90 to rotate around the handle axle 94. The action arm 90 rotation forces the pulling arm 96 to rotate clockwise around the secondary axle 98, pulling the locking pin 88 out of the curved rotation member 45, allowing the front frame assembly 42 and the rear frame assembly 44 to rotate in opposite directions about the helicoidal bushing assembly 54, folding the bicycle.

As a theft safety feature, the release lever 80 is flush with the outside of rear frame assembly 44, inaccessible to the rider.

Figure 10:
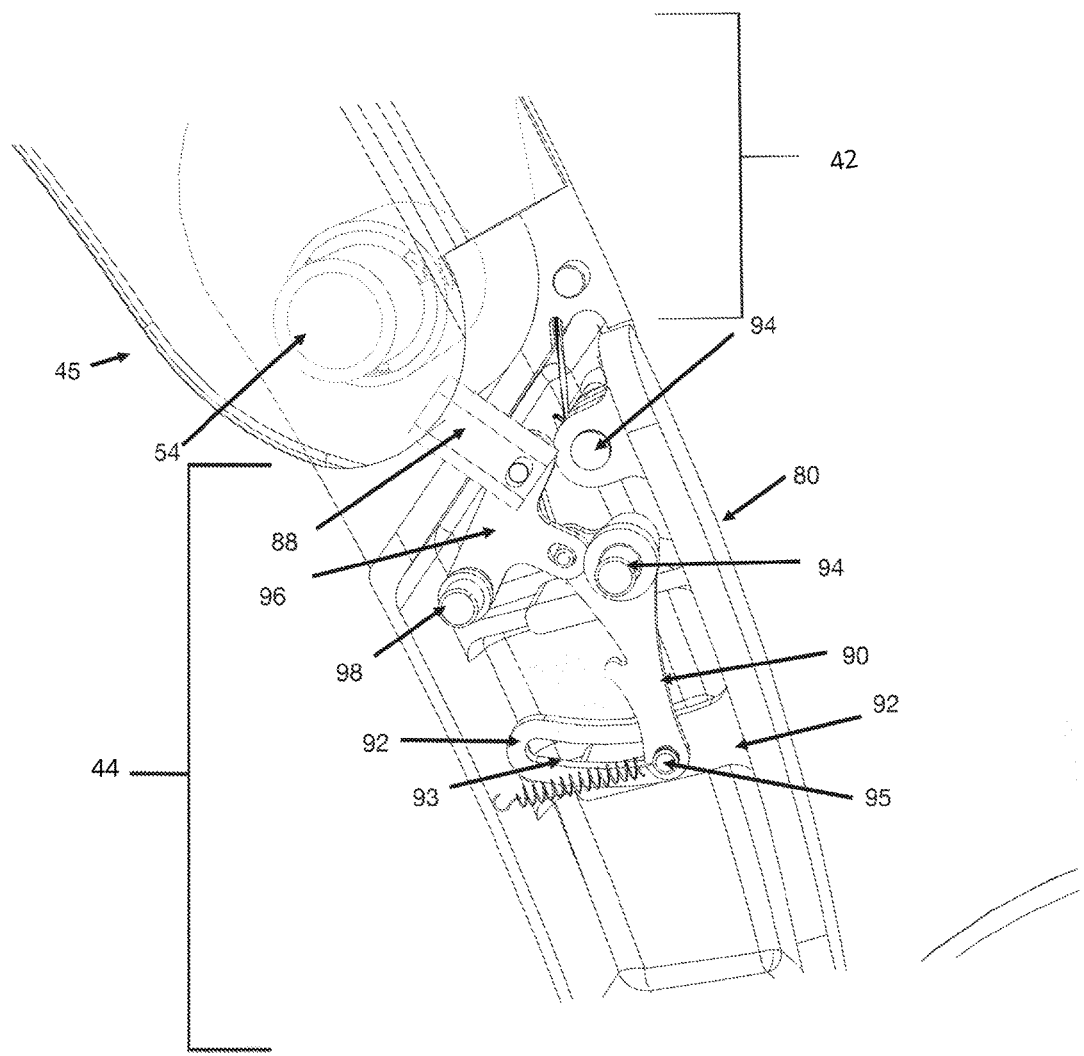
FIG. 10 shows a right side cross-section view of additional components of the unlocking mechanism that unlock the release lever using a wireless remote device.

FIG. 10 shows a right side cross-section view of additional components of the unlocking mechanism that unlock the release lever using a wireless remote device.

The wireless remote device can be a standalone unit, or a mobile app on a smartphone. Other activation devices or wireless protocols are contemplated, including but not limited to Wi-Fi, Bluetooth, infrared, near field communications (NFC) or manual devices such as a key or a combination lock.

The micro servo 82 is connected is a powered unit, connected to batteries via a micro servo cable 88.

On one embodiment, the bicycle has a pedal assist motor 40 attached to the rear wheel hub 69. Both the power assist motor 40 and the micro servo 82 share batteries located in the front frame assembly 42. Other battery storage locations and other types of power are contemplated.

Figure 11:
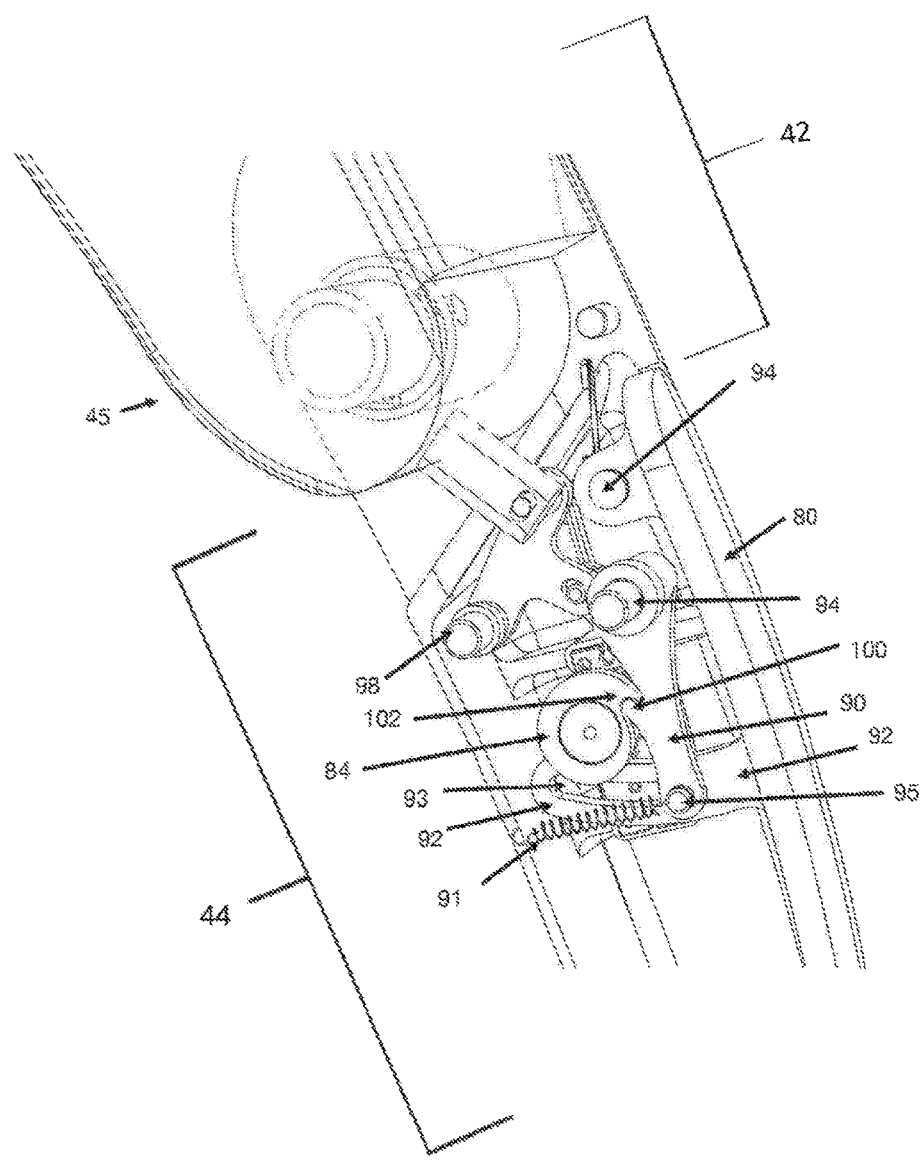
FIG. 11 shows a left side cross-section view of additional components of the unlocking mechanism that unlock the release lever using a wireless remote device.
Figure 12:
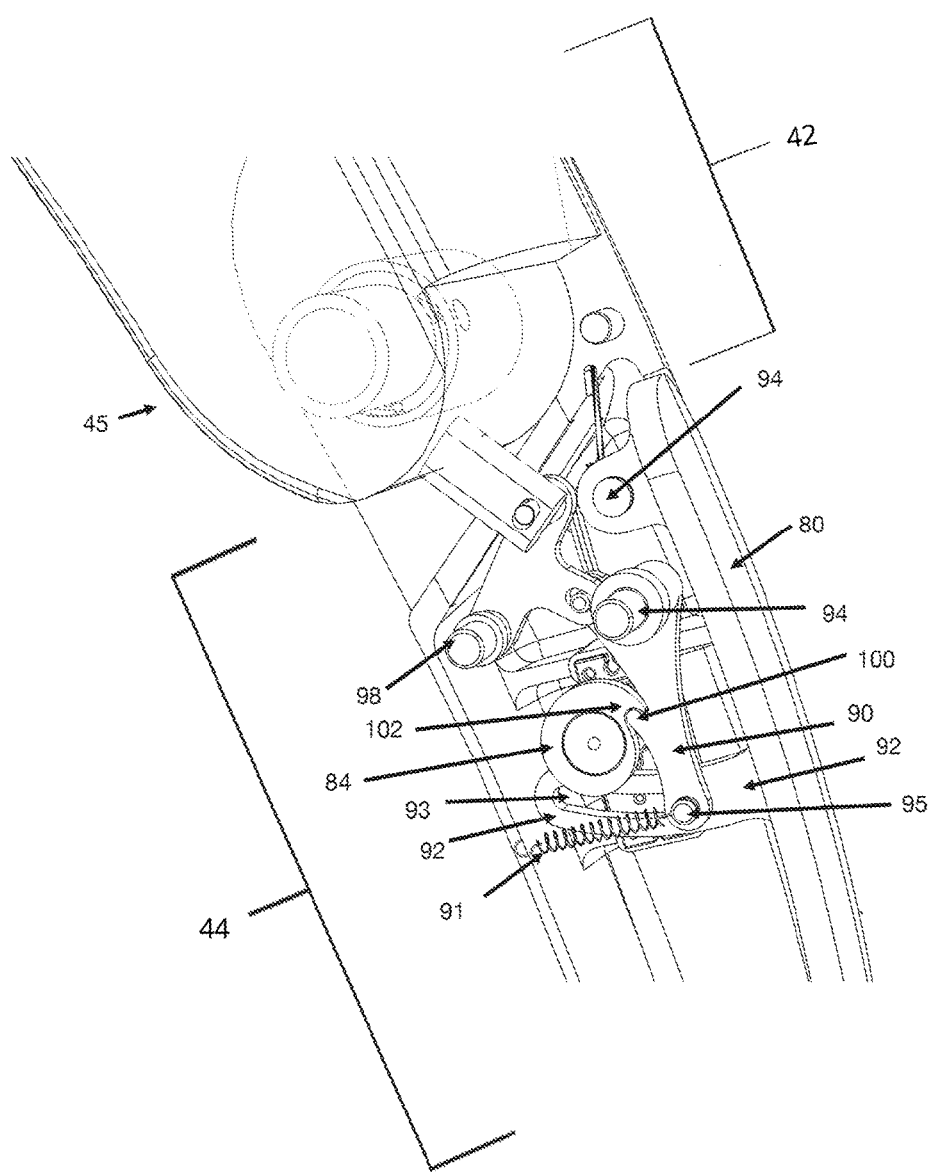

FIG. 11 shows a left side cross-section view of hinge point 46 with the additional components of the unlocking mechanism that can unlock the release lever 80 from a wireless remote device.

The micro servo 82 is connected to a locking disk 84. A flange 100 on the left side of the action arm 90 fits into a notch 102 in the locking disk 84, holding the action arm 90 in place. The lower edge of the locking disk 84 rests against the glide extension 92.

Activating the micro servo 82 rotates the locking disk 84, spinning the notch 102 away from the flange 100, unlocking the action arm 90. Spring 91 pushes the action arm rearward wherein the action arm glide 95 comes into contact with the end of the glide channel 93, forcing the lower end of the release lever 80 out, away from its flush position on rear frame assembly 44.

The release lever 80 can now be accessed by the rider.

In the preferred embodiment, the release lever 80 also acts as a gripping point for folding and unfolding the frame as well as wheeling the bicycle while in its folded position.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A folding bicycle frame comprising:
a front frame assembly comprising a forward end adapted for mechanical engagement with a front fork assembly, said front fork engaged with a front wheel assembly;
a rear frame assembly comprising a rearward end engaged with a rear fork assembly, said rear fork assembly engaged with a rear wheel assembly;
said front frame assembly having a rearward end and said rear frame assembly having a forward end, each of said rearward and forward ends are engaged with a hinge point containing a bushing assembly which defines a longitudinal axis therethrough;
said front wheel assembly and said rear wheel assembly aligned and spaced from one another longitudinally in an open position for riding;
said front frame assembly and said rear frame assembly configured to rotate in opposite directions within a folding arc around said bushing assembly and about said longitudinal axis, between said open position and a folded position wherein said front wheel assembly and said rear wheel assembly are substantially adjacent to each other laterally;
wherein, upon rotation of said front frame assembly and said rear frame assembly from said open position to said folded position, said front and rear frame assemblies separate from one another laterally in an amount sufficient to permit said front wheel assembly and said rear wheel assembly to be folded around said bushing assembly at the hinge point and rest substantially adjacent to each other laterally;
wherein the hinge point contains bushing holes on an interior side of said front and rear frame assemblies;
said bushing assembly adapted for positioning within said bushing holes;
said bushing assembly comprising a helicoidal bushing assembly containing a helicoidal axle having two or more external helical threads and a helicoidal bushing surrounding a part of the helicoidal axle;
said helicoidal bushing having interior extrusions that fit within the external helical threads;
said helicoidal bushing adapted for rotation around said helicoidal axle;
said helicoidal bushing assembly elongating or contracting during rotation about said helicoidal axle when said front frame assembly and said rear frame assembly are rotated between said open position and said folded position.

2. The folding bicycle frame according to claim 1 wherein the hinge point is locked at the open position.

3. The folding bicycle frame according to claim 1 wherein the hinge point is locked at the folded position.

4. The folding bicycle frame according to claim 2 wherein a release lever is locked or unlocked using a remote electronic device.

5. The folding bicycle frame according to claim 4 wherein the remote electronic device is a mobile application on a smartphone.

6. The folding bicycle frame according to claim 1 further comprising a brake and a locking pin, wherein:

said bicycle frame folds by application of said brake to the rear wheel which unlocks the hinge point, and rolls said front frame assembly backward until said front wheel assembly and said rear wheel assembly are substantially adjacent to each other laterally and said locking pin is engaged.

7. A method of folding the bicycle frame according to claim 1 from an open position to a folded position, the method steps comprising:
  unlocking the hinge point located between said front frame assembly and said rear frame assembly, and
  applying upward force on said rear frame assembly until said front wheel frame assembly and said rear wheel frame assembly roll into a position substantially adjacent to each other laterally; and
  providing said front frame assembly having a front tube and a single front fork in mechanical engagement with said front wheel assembly, and said rear frame assembly having a rear tube, a crank set, and a single rear fork in mechanical engagement with said rear wheel assembly.

8. The method of claim 7 further comprising the steps of:
  providing both a rear brake and a rear brake lever on said rear wheel assembly for actuating said rear brake,
  actuating said rear brake lever to deploy said rear brake into a braking position,
  unlocking the hinge point,
  rolling said front frame assembly backward until said front wheel assembly and said rear wheel assembly are substantially adjacent to each other laterally, and
  engaging a locking pin.

9. The method according to claim 7 whereby a remote wireless device unlocks the hinge point to the open position and locks the hinge point to the closed position.

10. The method according to claim 8 whereby a remote wireless device unlocks the hinge point to the open position and locks the hinge point to the closed position.

* * * * *